No. 740,293. PATENTED SEPT. 29, 1903.
G. E. LOEBLE.
DECOY.
APPLICATION FILED MAR. 11, 1903.
NO MODEL. 2 SHEETS—SHEET 1.
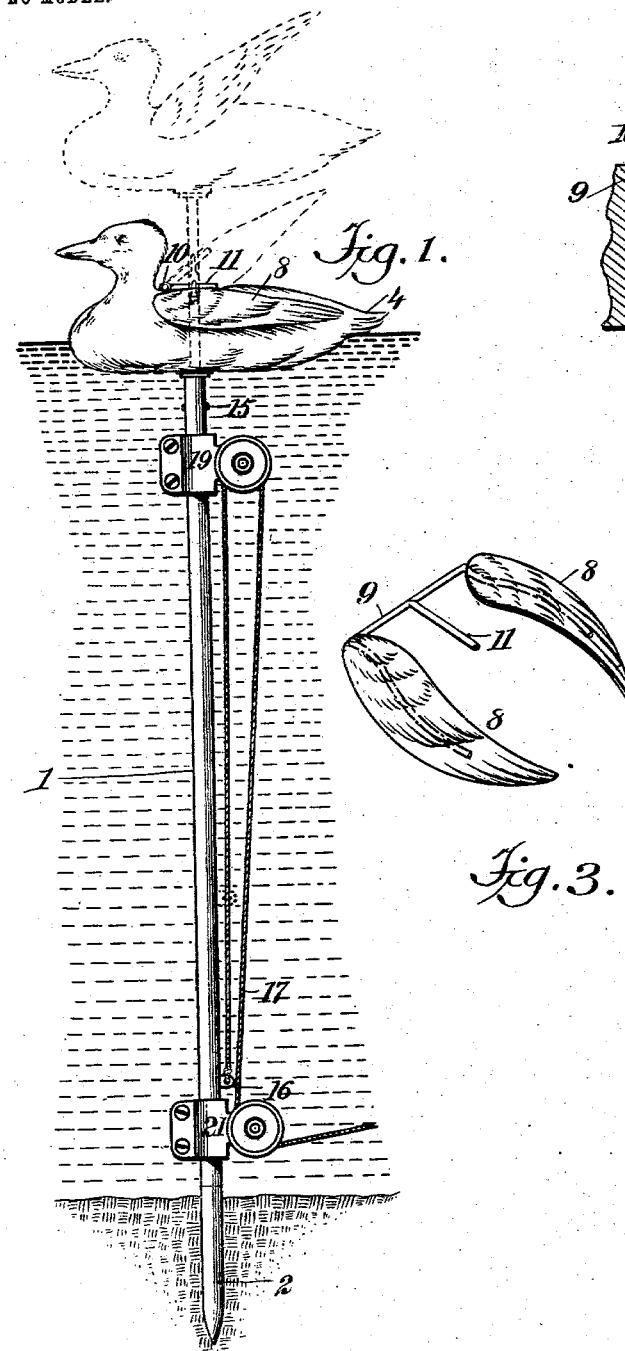
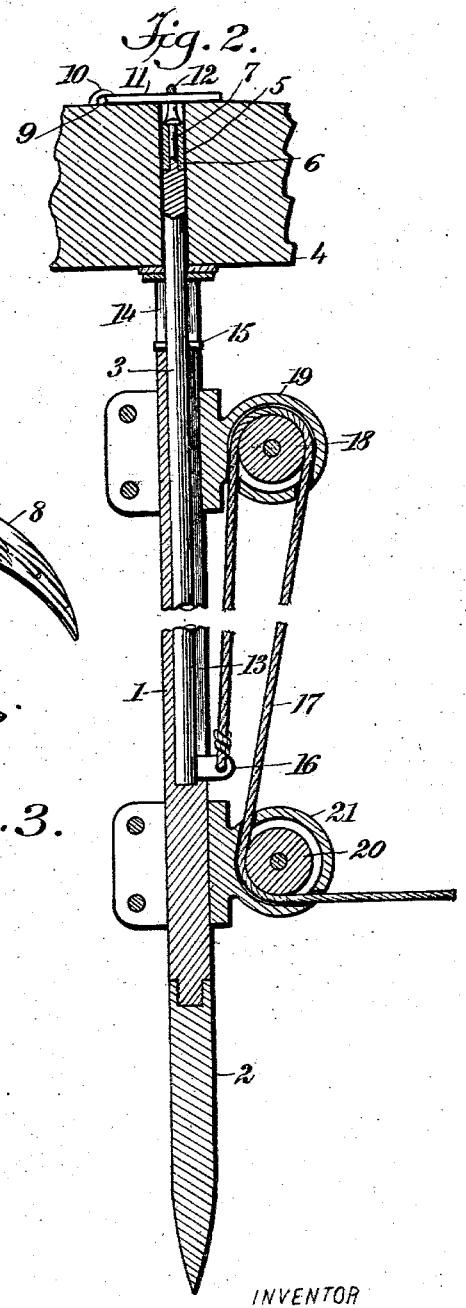
INVENTOR
Gottlob E. Loeble
BY
ATTORNEYS.

No. 740,293. PATENTED SEPT. 29, 1903.
G. E. LOEBLE.
DECOY.
APPLICATION FILED MAR. 11, 1903.
NO MODEL. 2 SHEETS—SHEET 2.

WITNESSES:

INVENTOR
Gottlob E. Loeble
BY
ATTORNEYS.

No. 740,293.

Patented September 29, 1903.

UNITED STATES PATENT OFFICE.

GOTTLOB E. LOEBLE, OF NEW YORK, N. Y.

DECOY.

SPECIFICATION forming part of Letters Patent No. 740,293, dated September 29, 1903.

Application filed March 11, 1903. Serial No. 147,259. (No model.)

*To all whom it may concern:*

Be it known that I, GOTTLOB E. LOEBLE, a citizen of the United States, and a resident of the city of New York, borough of Brooklyn, in the county of Kings and State of New York, have invented a new and Improved Decoy, of which the following is a full, clear, and exact description.

This invention relates to improvements in decoys for wild birds or fowls, especially aquatic birds or fowls, an object being to provide a decoy so arranged as to be operated from a distance to rise and fall and to move the wings, thus giving a life-like appearance and immediately attracting wild birds or fowls.

I will describe a decoy embodying my invention and then point out the novel features in the appended claims.

Reference is to be had to the accompanying drawings, forming a part of this specification, in which similar characters of reference indicate corresponding parts in all the figures.

Figure 4:
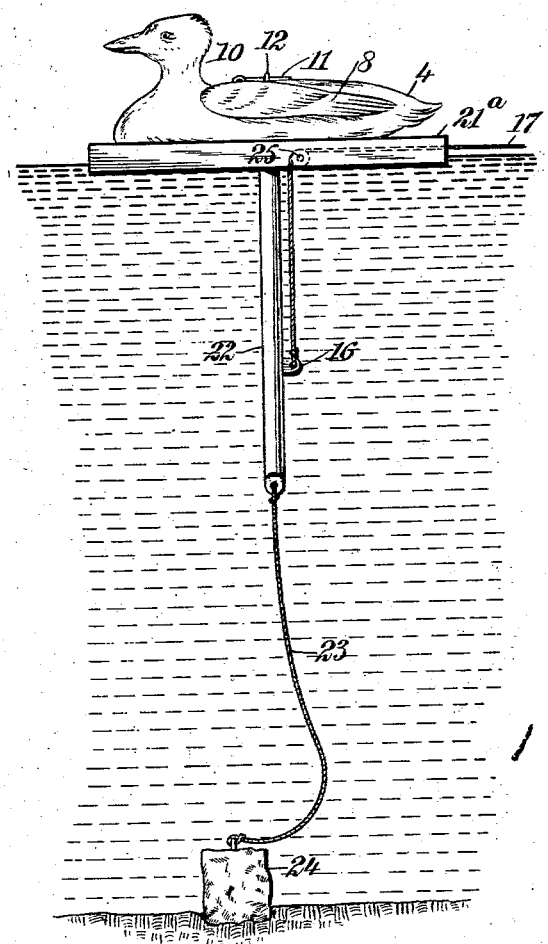

Figure 1 is a side elevation of a decoy embodying my invention. Fig. 2 is a sectional elevation thereof. Fig. 3 is a perspective view of the wings. Fig. 4 is a side elevation showing a modification, and Fig. 5 is a sectional elevation thereof.

In Figs. 1 and 2 the anchoring device consists of a tubular rod 1, which, as here shown, has a pike 2 removably secured to its lower end. By making the pike 2 removable it is obvious that various lengths may be employed, depending upon the depth of the water in which the decoy is to be placed. It is to be understood, however, that the part 2 is practically a continuation of the part 1. Movable vertically in the tubular member 1 is a rod 3, on which the decoy 4 is mounted to rotate, so as to keep the head to the wind. The decoy has a vertical opening 5, in which is secured a sleeve 6, which engages with a reduced portion 7 at the upper end of the rod 3. The wings 8 are connected by a cross-rod 9, which is mounted to swing in eyes 10, attached to the upper side of the decoy. From this rod 9 a finger 11 extends rearward and engages in a loop 12, attached to the sleeve 6. The tubular rod 1 is longitudinally slotted at one side, as indicated at 13, and at its upper end it is provided with a short slot 14, opposite the slot 13. A pin 15 extends through the rod 3 and into these slots 13 14, and when the decoy is in its lower position the pin will rest on the lower wall of the slot 14. Extended outward from the rod 3 and through the slot 13 is a lug 16, to which one end of a cord or line 17 is attached. This cord or line extends upward over a pulley 18, mounted in a bracket or housing 19, attached to the tubular rod 1 above the lug 16, and thence down around a pulley 20, mounted in a housing 21, attached to said rod 1 below the lug 16. From this pulley 20 the line extends to a blind or other point where the gunner may be located.

In the operation the decoy is to be anchored in the water among a number of other ordinary decoys, and as fowls are seen flying over the gunner by drawing upon the line 17 will first cause a vertical movement of the wings, which will immediately attract the game, and then as the pin 15 engages with the lower side of the decoy the said decoy will be lifted from the water. Of course upon releasing the line 17 the decoy and wings will fall by gravity to normal position.

Figure 5:
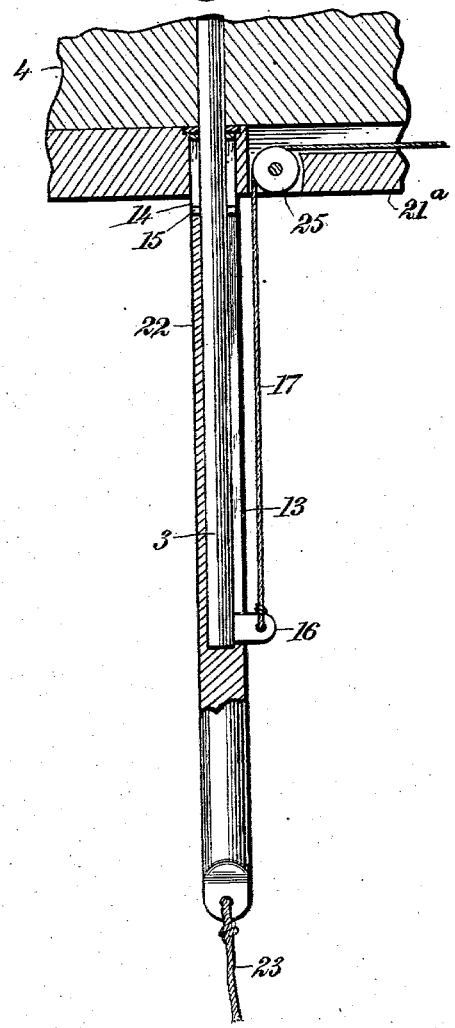

In Figs. 4 and 5 I have shown the decoy as supported by a float 21ª, from which a tubular rod 22 extends downward and is connected, by means of a cable 23, with an anchor 24. The decoy in this instance is mounted on a rod similar to the rod 3; but the draw-line 17 extends over a pulley 25, mounted on the float. The operation of this device is substantially the same as that first described.

Having thus described my invention, I claim as new and desire to secure by Letters Patent—

1. A decoy, an anchoring device therefor, and means for causing vertical movement of the decoy relatively to the anchoring device.

2. An anchoring device, a decoy, movable wings on the decoy, and means operating first to swing the wings upward and then moving the decoy upward relatively to the anchoring device.

3. An anchoring device, comprising a tubular rod having an outwardly-opening longitudinal slot at one side, a rod movable in the tubular rod, a decoy mounted on said rod and adapted to swing thereon, a lug extended outward from said slot through the slot in the tubular rod, a pulley attached to the tubular rod above said lug, a pulley attached to the tubular rod below said lug, and a draw-line extended from said lug around said pulleys.

4. An anchoring device, comprising a tubular rod having an outwardly-opening longitudinal slot at one side and also an outwardly-opening slot at the opposite side at the upper end, a pin extended through said rod into said slots, a sleeve mounted to rotate on said rod, a decoy attached to said sleeve, wings for said decoy, a rod connecting said wings, a finger extended rearward from said rod, a loop connection between said finger and said sleeve, and means for causing vertical movement of the wings and decoy.

5. A decoy in the form of a water-fowl, adapted to be supported in the water, and means operating to first move the wings and then to raise the decoy out of the water.

In testimony whereof I have signed my name to this specification in the presence of two subscribing witnesses.

GOTTLOB E. LOEBLE.

Witnesses:
GEORGE A. ZABRISKIE,
WILLIAM MILNE.